United States Patent
Kay et al.

(10) Patent No.: US 12,000,730 B2
(45) Date of Patent: Jun. 4, 2024

(54) SYSTEM AND METHOD FOR MONITORING SUBSURFACE STEAM CHAMBER DEVELOPMENT USING FIBER OPTIC CABLES

(71) Applicant: Cenovus Energy Inc., Calgary (CA)

(72) Inventors: Anthony Kay, Calgary (CA); Hong Feng, Calgary (CA)

(73) Assignee: Cenovus Energy Inc., Calgary (CA)

( * ) Notice: Subject to any disclaimer, the term of this patent is extended or adjusted under 35 U.S.C. 154(b) by 3 days.

(21) Appl. No.: 17/722,735

(22) Filed: Apr. 18, 2022

(65) Prior Publication Data

US 2022/0333977 A1    Oct. 20, 2022

Related U.S. Application Data

(60) Provisional application No. 63/175,700, filed on Apr. 16, 2021.

(51) Int. Cl.
  *G01H 9/00*     (2006.01)
  *E21B 47/107*   (2012.01)
  *E21B 47/135*   (2012.01)
  *E21B 43/24*    (2006.01)

(52) U.S. Cl.
  CPC .......... *G01H 9/004* (2013.01); *E21B 47/107* (2020.05); *E21B 47/135* (2020.05); *E21B 43/24* (2013.01)

(58) Field of Classification Search
  CPC ....... G01H 9/004; E21B 43/24; E21B 47/107; E21B 47/135
  See application file for complete search history.

(56) References Cited

U.S. PATENT DOCUMENTS

| | | | | |
|---|---|---|---|---|
| 6,065,538 A | * | 5/2000 | Reimers | E21B 49/006 181/112 |
| 9,720,118 B2 | * | 8/2017 | Petrella | E21B 47/107 |
| 9,880,048 B2 | * | 1/2018 | Martin | G01V 1/52 |
| 10,120,104 B2 | * | 11/2018 | Roy | G01V 1/46 |
| 10,591,623 B2 | * | 3/2020 | Jaaskelainen | E21B 47/107 |
| 10,794,164 B2 | * | 10/2020 | Batarseh | E21B 43/26 |
| 2012/0092960 A1 | * | 4/2012 | Gaston | G01V 1/226 367/35 |
| 2017/0260842 A1 | * | 9/2017 | Jin | E21B 47/107 |

* cited by examiner

*Primary Examiner* — Jill E Culler
(74) *Attorney, Agent, or Firm* — Gordon & Jacobson, P.C.

(57) ABSTRACT

Methods and systems are provided for monitoring subsurface steam chamber development in a thermal hydrocarbon recovery operation, which employ a fiber optic cable in a horizontal wellbore beneath the steam chamber as part of a distributed acoustic sensing technique in which the cable receives attenuated sound waves passing through the steam chamber and transmits a signal corresponding to the attenuated sound waves and unattenuated sound waves for subsequent signal processing.

5 Claims, 4 Drawing Sheets

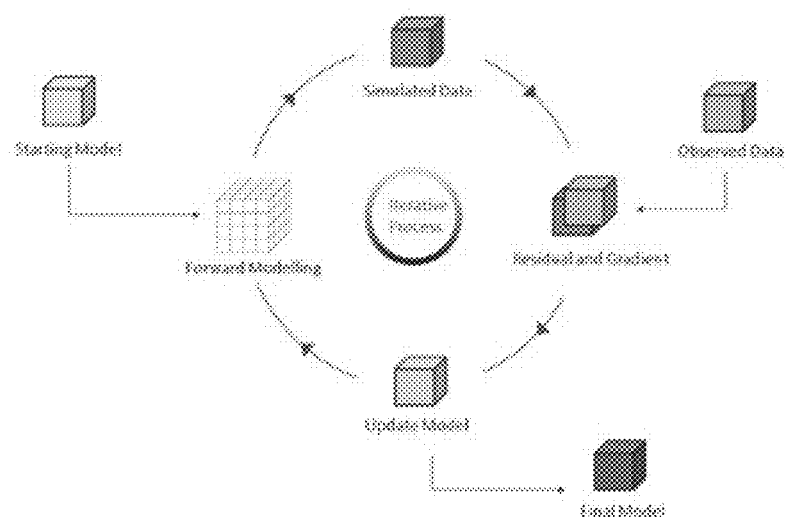
FIG. 5 Workflow of Full Waveform Inversion (FWI)
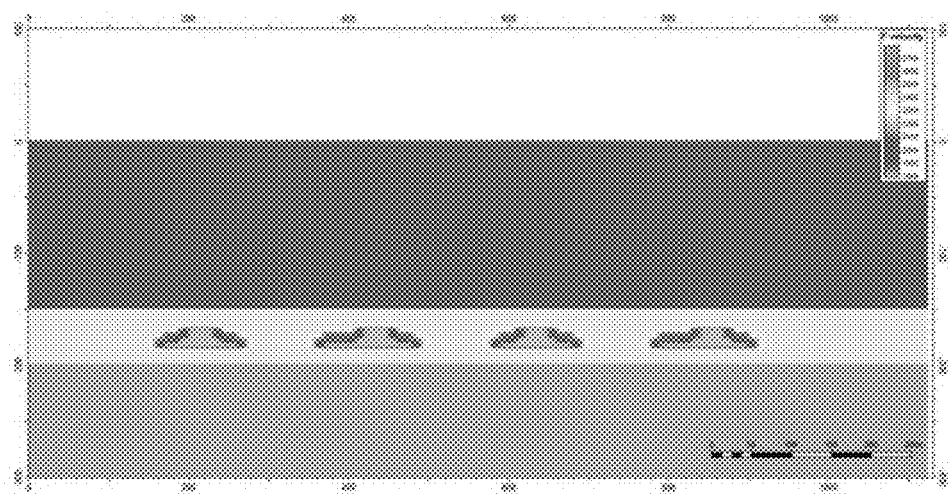
FIG. 6 Velocity model for 2D DAS synthetics

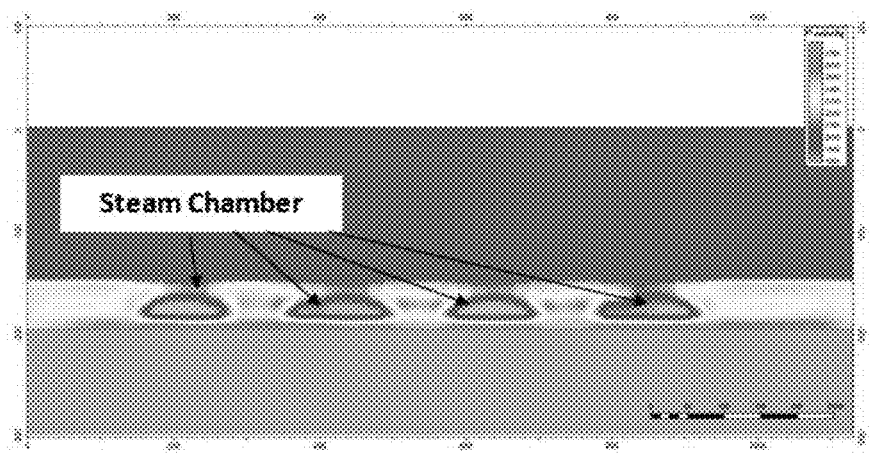
FIG. 7 Inverted Velocity Model using 2D DAS FWI
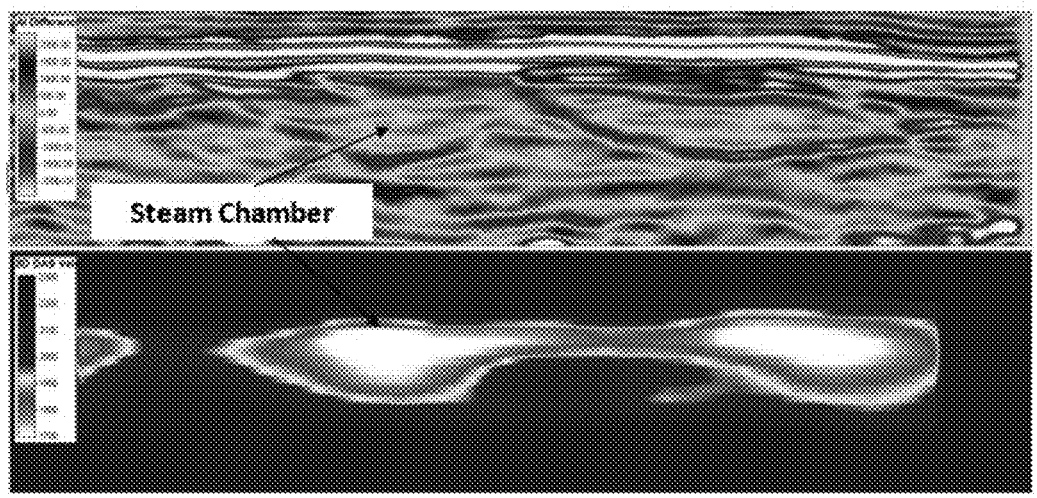
FIG. 8 Inverted Velocity Model using 3D DAS FWI

SYSTEM AND METHOD FOR MONITORING SUBSURFACE STEAM CHAMBER DEVELOPMENT USING FIBER OPTIC CABLES

CROSS-REFERENCE TO RELATED APPLICATION(S)

This subject application claims priority from U.S. Provisional Patent Application No. 63/175,700, filed on Apr. 16, 2021, herein incorporated by reference in its entirety.

TECHNICAL FIELD

This subject application relates to thermal hydrocarbon recovery, and more particularly to systems and methods for monitoring steam chamber development in a thermal hydrocarbon recovery operation.

BACKGROUND

In hydrocarbon resource exploration and production activities, it is well known to engage in seismic surveying to better understand the subsurface environment to enable focused determinations regarding the nature and extent of the target resource and how best to access it and pursue recovery operations.

In the case of thermal hydrocarbon recovery operations such as steam-assisted gravity drainage (SAGD), which involves injecting steam into a heavy hydrocarbon resource such as bitumen to mobilize the resource for production, so-called "steam chambers" form around the injection point where steam enters the reservoir rock. As the steam is injected and mobilizes the hydrocarbon resource, the hydrocarbon is produced to surface and a region of the reservoir is increasingly filled with steam, which chamber grows with continuing steam injection to mobilize hydrocarbon further out from the injection point. As the steam chambers expand further into the reservoir, they continue to mobilize additional hydrocarbon at the leading edge of the chamber, and chambers deriving from adjacent injection points can eventually grow together. It is desirable to understand how such steam chambers form and evolve as the resource is produced, which is challenging due to the depth of the target resource and the current state of surveying technology.

The primary current technology for monitoring subsurface conditions over a certain period of time is known as 4D seismic surveying, also known as 3D time-lapse surveying, which involves taking 3D surveys of a subsurface region over time. 4D seismic methods commonly employ signal sources at or beneath the surface, for example dynamite set off in a purpose-drilled wellbore, with surface-located receivers such as geophones for receiving the signals reflected from subsurface structures. However, such conventional methods are expensive and sometimes fail to provide useful information regarding steam chambers, while commonly requiring significant surface disruption such as land clearing and new drilling programs required for the signal generation.

What is needed, therefore, is a method for monitoring steam chamber development that is less expensive and disruptive than conventional 4D methods but enables high-quality images of the steam chamber as it develops over time.

SUMMARY

The present disclosure is directed to the use of distributed acoustic sensing (DAS) techniques using fiber optic cables to continuously monitor the subsurface, and specifically to monitor steam chamber development in a thermal hydrocarbon recovery operation.

According to a first broad aspect of the present disclosure, there is provided a system for monitoring steam chamber development in a thermal hydrocarbon recovery operation, which includes:
  at least one horizontal wellbore extending at least partially beneath the steam chamber;
  a seismic wave source configured to generate sound waves, the sound waves becoming attenuated sound waves after passing through the steam chamber;
  a fiber optic cable situated within a portion of the at least one horizontal wellbore, the fiber optic cable configured to receive the attenuated sound waves and generate a signal; and
  a receiver configured to receive the signal.

In some exemplary embodiments of the first aspect of the present disclosure, the at least one wellbore is a plurality of wellbores, each provided with a fiber optic cable for receiving sound waves which may or may not have passed through the steam chamber. The at least one wellbore is preferably but not necessarily a wellbore used in the thermal hydrocarbon recovery operation, such as for one non-limiting example a steam-assisted gravity drainage operation that generates the steam chamber, in which case the at least one wellbore would serve a dual purpose of mobilizing the hydrocarbon and also housing the fiber optic cable that is part of the monitoring apparatus for the steam chamber development.

In some exemplary embodiments of the first aspect of the present disclosure, the system further comprises a second fiber optic cable that is positioned on surface above the steam chamber. Having an additional fiber optic cable on the surface may provide additional data to enhance understanding of the steam chamber development.

In some exemplary embodiments of the first aspect of the present disclosure, the seismic wave source is a sound wave generator which is located in a vertical wellbore. The vertical wellbore may be drilled specifically for purposes of the steam chamber monitoring, or it may be an existing observation well that is part of the thermal hydrocarbon recovery operation and thus serves a dual purpose. It is preferable for the seismic wave source to be in the subsurface to reduce surface disruption. Alternatively, the seismic wave source may be naturally occurring passive subsurface seismic waves, for example from subsurface movement.

In some exemplary embodiments of the first aspect of the present disclosure, the receiver is part of or in communication with a processor, the processor configured to process the signal. The processing may generate an image of the steam chamber based on the signal.

According to a second broad aspect of the present disclosure, there is a provided a method for monitoring steam chamber development in a thermal hydrocarbon recovery operation, which includes:
  a. drilling at least one horizontal wellbore extending at least partially beneath the steam chamber;
  b. deploying a fiber optic cable in the at least one horizontal wellbore;
  c. receiving a seismic wave at the fiber optic cable, the seismic wave attenuated when passing through the steam chamber, and generating a signal;
  d. transmitting the signal along the fiber optic cable to a receiver; and
  e. receiving the signal at the receiver.

In some exemplary embodiments of the second aspect of the present disclosure, the seismic wave is naturally occurring due to subsurface movement. In some other exemplary embodiments, the seismic wave is generated by a seismic wave source such as for one non-limiting example a piezoelectric source located in a vertical well, which vertical well may be an existing observation well that is part of the thermal hydrocarbon recovery operation.

In some exemplary embodiments of the second aspect of the present disclosure, the method further comprises processing the signal of e) to generate data regarding the steam chamber. In some preferred embodiments, the processing involves full-waveform inversion.

While the focus of the present disclosure is on monitoring steam chamber development during thermal recovery operations such as steam-assisted gravity drainage operations, it will be clear to those skilled in the art that systems and methods as disclosed herein may be applicable to monitoring other kinds of subsurface environment changes, for one non-limiting example monitoring subsurface CO2 sequestration structures.

A detailed description of exemplary embodiments of the present disclosure is given in the following. It is to be understood, however, that the invention of the present disclosure is not to be construed as being limited to these embodiments. The exemplary embodiments are directed to particular applications, while it will be clear to those skilled in the art that the present invention has applicability beyond the exemplary embodiments set forth herein.

BRIEF DESCRIPTION OF THE DRAWINGS

In the accompanying drawings, which illustrate exemplary embodiments of the present disclosure:

FIG. 5 is a schematic diagram of an exemplary workflow of full wave inversion (FWI) of three-dimensional (3D) distributed acoustic sensing (DAS) survey data.

FIG. 6 illustrates an exemplary subsurface velocity model that can be used for full wave inversion (FWI) of two-dimensional (2D) distributed acoustic sensing (DAS) survey data according to the present disclosure.

FIG. 7 illustrates an exemplary subsurface velocity model that results from full wave inversion (FWI) of two-dimensional (2D) distributed acoustic sensing (DAS) survey data according to the present disclosure.

FIG. 8 illustrates an exemplary subsurface velocity model that results from full wave inversion (FWI) of three-dimensional (2D) distributed acoustic sensing (DAS) survey data according to the present disclosure.

Exemplary embodiments will now be described with reference to the accompanying drawings.

DETAILED DESCRIPTION OF EXEMPLARY EMBODIMENTS

Throughout the following description, specific details are set forth in order to provide a more thorough understanding to persons skilled in the art. However, well known elements may not have been shown or described in detail to avoid unnecessarily obscuring the disclosure. The following description of examples of the invention is not intended to be exhaustive or to limit the invention to the precise form of any exemplary embodiment. Accordingly, the description and drawings are to be regarded in an illustrative, rather than a restrictive, sense.

The present disclosure is directed to systems and methods for using DAS with fiber optic cables to monitor steam chamber development in a thermal hydrocarbon recovery operations such as a SAGD heavy hydrocarbon production operation. Other possible applications would be clear to those skilled in the art based on the within disclosure, such as for one non-limiting example monitoring subsurface $CO_2$ sequestration structures.

Exemplary embodiments of the present disclosure use fiber optic cables as data receiving points and downhole acoustic signal generators as seismic source points. The fiber optic cables can be installed in subsurface horizontal wells, and optionally also laid out on the earth's surface, to record seismic signals from an acoustic source. As complementary receivers, surface fiber optic cables can be deployed at approximately 20-30 cm using a micro-trenching machine that cuts a shallow, narrow slit to reduce surface disturbance, and place cable without opening a deep trench.

Existing surface-based seismic programs require surface disturbance such as line clearing in forested areas, hole-digging for placement of seismic signal receivers (geophones), and hole-drilling for programs requiring dynamite as the signal source. In exemplary embodiments of the present disclosure, in the context of SAGD projects, the horizontal producer wells already have fiber optic lines installed therein, and vertical observation wells can be used to deploy a signal source. After acquiring the DAS data, data processing techniques such as full-waveform inversion are preferably applied to the raw field data to obtain the steam chamber image.

DAS using fiber optic cables is known in the oil and gas industry for monitoring fluid inflow in wellbores—which is the reason that cables are already present in some existing horizontal wellbores in SAGD operations—and on surface to monitor ground movement. Both are passive applications of the technology rather than an active surveying/monitoring technique. In the present disclosure, DAS can be employed to actively monitor the development of steam chambers, and by using existing cables in some cases the surface impact is significantly reduced.

Figure 1:
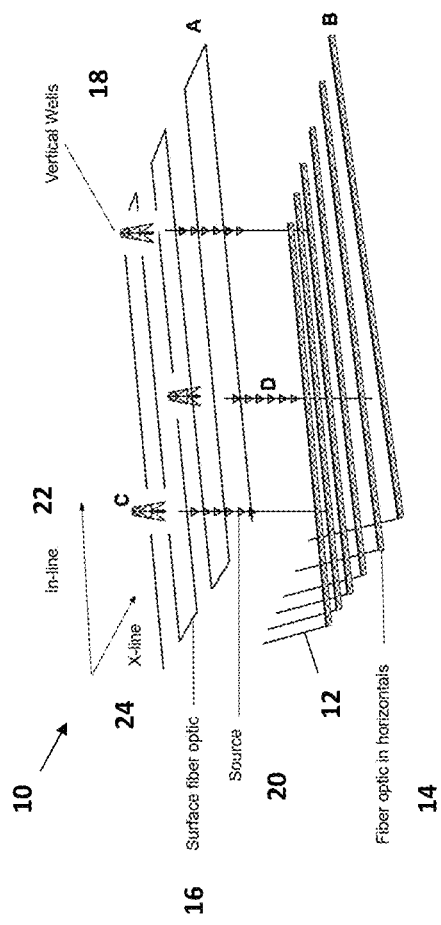
FIG. 1 is a perspective schematic view of an exemplary system according to the present disclosure.

Turning now to FIG. 1, there is illustrated an exemplary system according to the present disclosure. The system 10 comprises a series of parallel horizontal wellbores 12, each of which contains a length of fiber optic cable 14. Additional fiber optic cabling 16 is laid out on the surface in a back-and-forth pattern to cover the target area, although persons skilled in the art will know of other arrangements that would be useful in different contexts or in light of surface geography complications impacting deployment.

As noted above, vertical wells 18 can be used to deploy source generators 20 in the subsurface, to again reduce surface disruption. Although only a single source generator 20 is labelled in FIG. 1, numerous generators 20 can be deployed in various wells 18 and at varying depths, as determined by the operator.

FIG. 1 further points out an in-line axis 22, which is generally parallel to the horizontal extent of the wellbores 12 and cables 14, and a cross-axis or x-axis 24 which is perpendicular to the horizontal extent of the wellbores 12 and cables 14, as are further discussed below.

As the steam chamber develops, it has an impact on the velocity of the acoustic signal that passes through it, resulting in an attenuated signal that can provide useful information to the skilled data analyst regarding steam chamber development.

Figure 2:
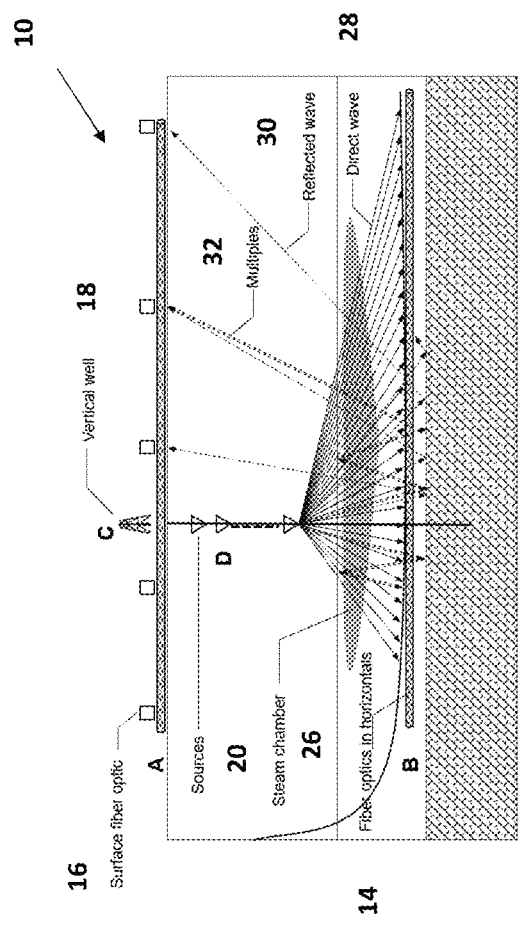
FIG. 2 is a sectional schematic view showing inline wave paths, along the length of one of the subsurface fiber optic cables.

Using the fiber optic cables 14 installed in the subsurface horizontal wells 12 may provide a very high resolution of the steam chamber image along the horizontal length (inline direction 22) because the data are over-sampling along the inline direction 22. See for example FIG. 2, which illustrates the system 10 along the in-line axis 22. As can be seen, the acoustic wave source 20 generates direct waves 28 which may or may not pass through the steam chamber 26 and be attenuated, and reflected waves 30 and multiples 32 are also generated within the subsurface environment, all of which can be detected at the subsurface and surface fiber optic cables 14, 16.

Figure 3:
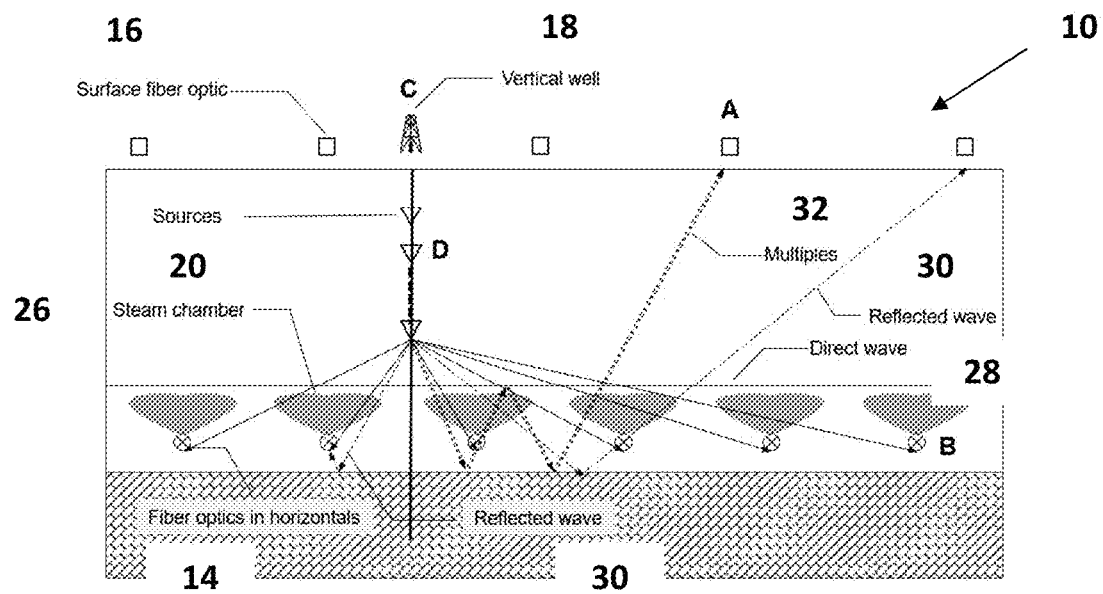
FIG. 3 is a sectional schematic view showing cross-line wave paths, perpendicular to the parallel subsurface fiber optic cables.
Figure 4:
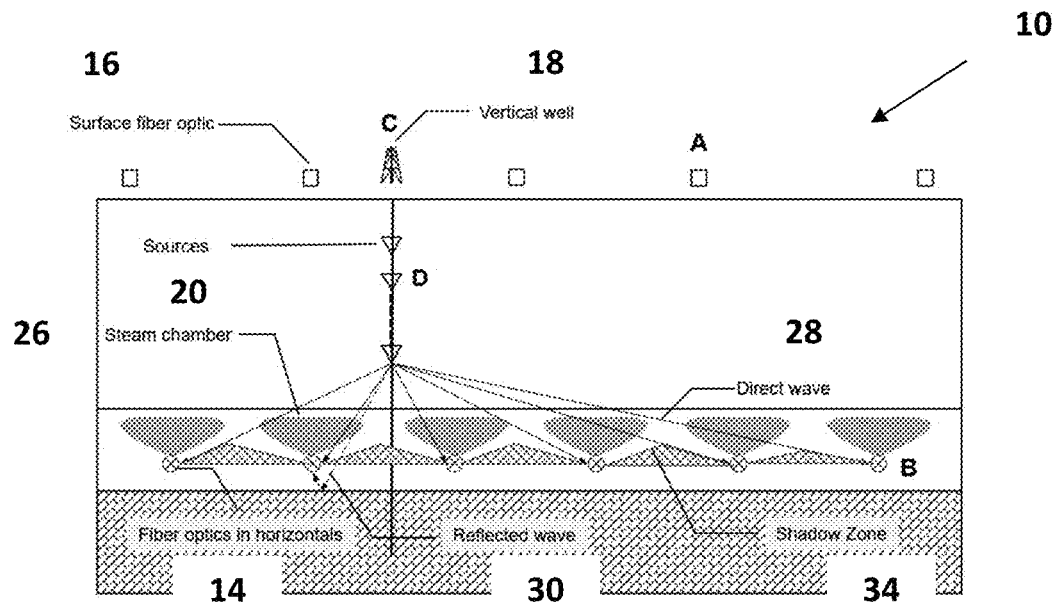
FIG. 4 is the view of FIG. 3 but including shadow zones of reduced direct wave passage through the steam chambers between the seismic source and the subsurface fiber optic cable.

However, there will be an under-sampling issue along the cross-line direction 24 due to the creation of "shadow zones" as illustrated in FIG. 3 and FIG. 4. FIG. 3 shows how the direct waves 28, reflected waves 30 and multiples 32 travel through the subsurface, including passing through the steam chambers 26 forming adjacent the horizontal wellbores 12. Due to the spacing of the horizontal wellbores 12, seismic waves penetrating through the shadow zones 34 cannot be received as direct waves 28 by the downhole fiber optic cables 14. To address this issue, surface-deployed fiber optic cables 16 can be used to mitigate the shadow issue by providing additional receivers for the waves.

A further aspect of some exemplary embodiments of the present disclosure is the use of newer data processing techniques that are being considered in some seismic data contexts, but have not yet been used in the present context, and may be more cost-effective and entail a reduced surface disturbance compared to conventional 3D seismic acquisition programs. Specifically, some exemplary embodiments of the present disclosure employ full-waveform inversion techniques given the potential complexity of the data sets given the use of downhole and optional surface fiber optic cables as receivers.

Full-waveform inversion (FWI), also known as full-wavefield inversion, is a data processing technique that has been employed in the oil and gas industry in seismic surveying, primarily in offshore 3D surveying of subsurface structures. In seismic surveying, sound waves are generated and reflect back from numerous subsurface layers and structures, being received at microphones such as hydrophones (in the offshore context) and geophones (in some onshore settings). This results in a very large amount of data, and for many years computer processing capabilities could only utilize a fraction of that data—one could see rock layers, but the rock properties were generally too difficult to ascertain. Historically, 3D seismic methods such as travel time tomography (which is focused only on wave travel time) were limited as to both the waves that could be used and the depth of penetration. FWI is known to be useful for addressing the inherent complexity of seismic data, as it can use all of the wave; with the use of supercomputers and more advanced algorithms the full wavefield can be processed. In FWI, field data is used to generate simulated models of the subsurface, and then the models are compared against the raw field data in an iterative process to improve the model (the "inversion" aspect). The model is compared to the raw data, the differences being a residual which is determined and minimized through the iterative inversion process.

However, FWI has not previously been used with distributed acoustic sensing, nor for monitoring subsurface changes over time such as steam chamber development. Some embodiments of the present disclosure preferably employ FWI to enhance the data received from the fiber optic cables. FWI is of particular utility due to the complexity involved in acquiring data from both subsurface- and surface-deployed fiber optic cables.

FWI initially emerged as an advanced tool for complex velocity model building. The FWI-derived velocity model coupled with advanced imaging algorithms such as pre-stack depth migration (RTM) can dramatically improve the subsurface imaging from extremely complicated structures that exhibit abrupt vertical and lateral velocity changes. The oil and gas industry has seen very successful applications of FWI using the surface seismic data in different geologic settings such as the complex subsalt targets in the Gulf of Mexico.

The application of FWI to 3D DAS is an innovative way to image the steam chamber. The proposed 3D DAS geometry is very different from conventional seismic programs in that conventional seismic surveys use the source points and receivers on the surface and only the reflected wave is utilized to image the subsurface structure and rock properties. The conventional seismic workflow using reflection only cannot provide a clear subsurface imaging because the seismic wavefield gets shattered and complicated when the seismic wave travels from the low-velocity zone to the high-velocity zone or vice versa. 3D DAS FWI preferably uses supercomputers and an advanced algorithm of FWI, processing the full wavefield including all the seismic wave types (refraction, diffraction, multiples, or even elastic wave) through computer simulation to get a subsurface earth model in rich details in depth domain. The input of 3D DAS FWI workflow is the large quantities of the shot gathers recorded from the 3D DAS survey with a minor precondition of the data, and the output of the workflow are the subsurface rock properties mainly P-wave velocity and other anisotropy parameters. The inverted P-wave velocity can be used as a direct indicator of the steam chamber.

3D DAS FWI is driven by minimization of the data residual between the real raw shot gathers and the simulated shot gathers by an iterative process that results in a high-resolution velocity model (see FIG. 5). Two key requirements in the 3D DAS FWI workflow are the efficient forward modeling and the local differential computation, which are two major computational costs in the FWI process.

The 3D DAS FWI objective function can be formulated as:

$$\phi_{FWI} = \|d_s^{obs} - d_s^{pre}\|^2 + \tau_s \|Lm_s\|^2 \quad (1)$$

where, $d_s^{obs}$ and $d_s^{pre}$ represent the observed seismic waveform data and synthetic data. $\tau s$ is the smoothing parameters to balance the data misfit term and a regularization term. $m_s$ is the velocity model. The gradient of the FWI objective function is defined as the partial derivative of the cost function with respect to the model slowness:

$$\frac{\partial \phi_{FWI}}{\partial m_s} = \ddot{P}_F P_B + \tau_s L^T L m_s \quad (2)$$

where $\ddot{P}_F$ and $P_B$ are the forward and backward propagation wavefield for imaging that provides sensitivity impacts and directs waveform inversion.

For time-lapse 3D DAS FWI processing, the double-difference workflow can be used to invert the subsurface difference between baseline and monitor. The starting model of the double-difference FWI is the final model of the baseline 3D DAS FWI, and the input data of this workflow is the waveform difference between the monitor 3D DAS and baseline 3D DAS surveys. The waveform difference generated by the elastic property changes between the time-lapse surveys can be regarded as the scatter waves. Even though the starting model, which is the baseline model in this workflow, may have its own error, the scatter waves can be imaged/migrated to the isolated areas around the reservoirs, rather than to distribute the energy to the whole area. The theory of the double-difference FWI is described below.

Consider the following cost function in a joint baseline/monitor FWI:

$$E(m_{baseline}, m_{monitor}) = \qquad (3)$$
$$\|[d_{monitor} - u_{monitor}(m_{monitor})] - [d_{baseline} - u_{baseline}(m_{baseline})]\|^2 =$$
$$\|[d_{monitor} - d_{baseline}] - [u_{monitor}(m_{monitor}) - u_{baseline}(m_{baseline})]\|^2$$

where $d_{baseline}$ and $d_{monitor}$ are the baseline and monitor seismic waveforms, $m_{baseline}$ and $m_{monitor}$ are the baseline and monitor models $u_{baseline}$ and $u_{monitor}$ are the synthetic waveforms using the exiting baseline and monitor models respectively. The time-lapse 3D DAS FWI objective is to find a solution for $m_{baseline}$ and $m_{monitor}$ that can minimize the double differences in the cost function of equation (3).

Assuming a reasonable baseline model can be obtained from a standard baseline 3D DAS FWI, equation (3) can be written as follows:

$$E(m_{monitor}) = \|[d_{monitor} - d_{baseline} + u_{baseline}(m_{baseline})] - u_{monitor}(m_{monitor})\|^2 \qquad (4)$$

This cost function can be minimized by performing a monitor 3D DAS FWI but replacing the monitor seismic waveform with the input waveform that is the difference between the monitor and baseline waveforms plus the baseline synthetic waveform. The advantage of this method compared with a sequential 3D DAS FWI is that it should guarantee to converge to the baseline model if there is no waveform difference between the time-lapse 3D DAS surveys, so we can safely mask the areas if we believe there shouldn't be any change from the baseline model.

A multi-stage and multi-scale strategy can also be used in this 3D DAS FWI processing, from the travel time tomography which provides enough close initial velocity model to the double-difference FWI and from the low to the high-frequency components through the following workflow steps:

Workflow for the baseline 3D DAS FWI:
1. Geometry validation and trace editing
2. Theoretical transverse sensibility compensation
3. Surface-consistent amplitude balancing
4. Picking first breaks
5. Model building and travel time tomography
6. Surface-consistent residual statics
7. Test of bandwidth and Ricker frequency
8. Test of time-shifts of the Ricker wavelet so the synthetics of the starting model can match the first arrival seismic waveform
9. 3D DAS FWI and the final baseline velocity model Workflow for the monitor 4D time-lapse DAS double-difference FWI:
1. Geometry validation and trace editing of the monitor
2. Theoretical transverse sensibility compensation
3. Amplitude scaling of the monitor survey to match the baseline survey
4. Phase matching of the monitor and baseline surveys
5. Surface-consistent residual statics
6. 4D time-lapse DAS double-difference FWI
7. Final velocity difference and monitor velocity model 2D DAS FWI on the Synthetic 2D Data 2D DAS synthetic shot gathers were generated using the finite difference method. The source line is parallel to the subsurface horizontal. A total of 100 synthetic shot gathers were generated with 100 meters spacing, and each shot gather has 100 traces with 10-meter gauge length along the fiber optic. The subsurface velocity model (see FIG. 6) was the input of the finite difference simulation using the 2D acoustic wave equation to take into the variation of compressional velocity and density including the multiple simulation. The 2D DAS FWI algorithm was applied to the synthetic data and the results are shown in FIG. 7. The inverted reliable and high resolution velocity model is very close to the input velocity model.

3D DAS FWI on the Real Field 3D DAS Data

A substantial amount of 3D DAS shot gathers were recorded simultaneously when the 4D time-lapse surface seismic was shot. The 3D DAS FWI methodology was adapted for an innovative application on the 3D DAS shot gathers. Compared with the traditional 4D time-lapse surface seismic, the new 3D DAS FWI technology demonstrated some advantages and limitations. 2D DAS FWI has demonstrated FWI algorithm can produce a reliable and high-resolution velocity model using 2D DAS synthetic data generated from the finite difference method. However, the inadequate illumination from the shadow zone in the 3D DAS due to the sparse fiber-optic receiver lines imposes challenges on 3D DAS FWI. The inverted velocity along the horizontals shows a higher resolution image in the inline direction compared with the crossline direction which has an inadequate illumination. The preliminary analysis of the inverted 3D DAS FWI velocity shows a high-resolution velocity result where the illumination is highest. On the other hand, the 3D DAS FWI velocity at the edge of the survey shows some artifacts and poor results due to the inadequate illumination. The inverted velocity from the 3D DAS is shown in FIG. 8. 3D DAS FWI, as an innovative and cost-effective alternative to the conventional 4D time-lapse surface seismic, can deliver the velocity volume in the depth domain directly from the raw shot gathers with minor pre-processing of the 3D DAS shot gathers, which can result in a significantly reduced turnaround time to implement timely production decisions. To mitigate the illumination issue in the 3D DAS technology, the fiber on the surface can be used to resolve the illumination issue in the 3D DAS.

The foregoing is considered as illustrative only of the principles of the present invention. The scope of the claims should not be limited by the exemplary embodiments set forth in the foregoing, but should be given the broadest interpretation consistent with the specification as a whole.

The invention claimed is:

1. A method for monitoring steam chamber development in a reservoir generated by a thermal hydrocarbon recovery operation, the method comprising the steps of:
   a. drilling at least one horizontal wellbore as part of the thermal hydrocarbon recovery operation;

b. deploying a fiber optic cable in the at least one horizontal wellbore;
c. operating the thermal hydrocarbon recovery operation to form a steam chamber in the reservoir above the at least one horizontal wellbore;
d. locating a seismic wave source above and spaced from the steam chamber;
e. generating a plurality of seismic waves using the seismic wave source and receiving the plurality of seismic waves at the fiber optic cable that have passed through the reservoir, at least one of the plurality of seismic waves having passed from the seismic wave source and into and through the steam chamber and thereby being attenuated when passing through the steam chamber before receipt at the fiber optic cable forming at least one attenuated seismic wave, and the at least one attenuated seismic wave thereby providing information regarding steam chamber location within the reservoir between the seismic wave source and the fiber optic cable, and generating a signal including the information regarding the steam chamber location within the reservoir;
f. transmitting the signal along the fiber optic cable to a receiver including the information regarding the steam chamber location within the reservoir;
g. receiving the signal at the receiver; and
h. processing the signal to extract the information regarding the steam chamber location within the reservoir to monitor development of the steam chamber.

2. The method of claim 1 wherein the seismic wave source is a piezoelectric source.

3. The method of claim 1 wherein the seismic wave source is located in a vertical well.

4. The method of claim 3 wherein the vertical well is an existing observation well that is part of the thermal hydrocarbon recovery operation.

5. The method of claim 1 wherein the processing of the signal involves full-waveform inversion.

\* \* \* \* \*